(12) United States Patent
Lewis et al.

(10) Patent No.: US 11,207,831 B2
(45) Date of Patent: Dec. 28, 2021

(54) 3D PRINTED CORE-SHELL FILAMENT AND METHOD OF 3D PRINTING A CORE-SHELL FILAMENT

(71) Applicants: President and Fellows of Harvard College, Cambridge, MA (US); ETH Zurich (Swiss Federal Institute of Technology), Zurich (CH)

(72) Inventors: Jennifer A. Lewis, Cambridge, MA (US); Jochen Mueller, Dornhan (DE); Jordan R. Raney, Glenside, PA (US); Kristina Shea, Zurich (CH)

(73) Assignees: PRESIDENT AND FELLOWS OF HARVARD COLLEGE, Cambridge, MA (US); ETH ZURICH (SWISS FEDERAL INSTITUTE OF TECHNOLOGY), Zurich (CH)

( * ) Notice: Subject to any disclaimer, the term of this patent is extended or adjusted under 35 U.S.C. 154(b) by 0 days.

(21) Appl. No.: 16/466,106

(22) PCT Filed: Dec. 5, 2017

(86) PCT No.: PCT/US2017/064734
§ 371 (c)(1),
(2) Date: Jun. 3, 2019

(87) PCT Pub. No.: WO2018/106705
PCT Pub. Date: Jun. 14, 2018

(65) Prior Publication Data
US 2020/0070402 A1 Mar. 5, 2020

Related U.S. Application Data

(60) Provisional application No. 62/431,653, filed on Dec. 8, 2016, provisional application No. 62/431,723, filed on Dec. 8, 2016.

(51) Int. Cl.
*B29C 64/209* (2017.01)
*B33Y 10/00* (2015.01)
(Continued)

(52) U.S. Cl.
CPC .......... *B29C 64/209* (2017.08); *B29C 64/106* (2017.08); *B29C 64/118* (2017.08);
(Continued)

(58) Field of Classification Search
CPC ....... B29C 64/118; B29C 48/92; B29C 48/02; B29C 48/05; B29C 48/16; B33Y 80/00;
(Continued)

(56) References Cited

U.S. PATENT DOCUMENTS

| 4,515,435 A | 5/1985 | Anderson |
| 5,242,982 A | 9/1993 | Oshima et al. |

(Continued)

FOREIGN PATENT DOCUMENTS

| WO | WO 2013/096664 A1 | 6/2013 | |
| WO | WO-2013138204 A1 * | 9/2013 | ............... D01F 8/04 |

(Continued)

OTHER PUBLICATIONS

International Search Report and Written Opinion for PCT/US17/64734, dated Feb. 21, 2018 (12 pp.).
(Continued)

*Primary Examiner* — Elizabeth C Imani
(74) *Attorney, Agent, or Firm* — Crowell & Moring LLP

(57) ABSTRACT

A 3D printed core-shell filament comprises an elongated core radially surrounded by an outer shell with a barrier layer in between, where the elongated core comprises a ductile polymer and the outer shell comprises a stiff polymer having a Young's modulus higher than that of the ductile polymer. A lightweight lattice structure may comprise a
(Continued)

plurality of the 3D printed core-shell filaments deposited in layers.

12 Claims, 10 Drawing Sheets

(51) Int. Cl.
*B33Y 30/00* (2015.01)
*B29C 64/118* (2017.01)
*B33Y 70/00* (2020.01)
*B29C 64/106* (2017.01)
*B33Y 80/00* (2015.01)

(52) U.S. Cl.
CPC ............... *B33Y 10/00* (2014.12); *B33Y 30/00* (2014.12); *B33Y 70/00* (2014.12); *B33Y 80/00* (2014.12)

(58) Field of Classification Search
CPC .... D06M 23/00; D06M 15/263; D06M 15/55; D06M 15/507; D06M 15/333; D06M 23/08; D06M 15/643; D06M 15/256; D06M 11/79; D06M 11/74
See application file for complete search history.

(56) References Cited

U.S. PATENT DOCUMENTS

| | | | |
|---|---|---|---|
| 5,913,324 | A | 6/1999 | Signer |
| 7,053,125 | B2 | 5/2006 | Lewis et al. |
| 7,141,617 | B2 | 11/2006 | Gratson et al. |
| 7,790,061 | B2 | 9/2010 | Gratson et al. |
| 7,799,251 | B2 | 9/2010 | Therriault et al. |
| 7,922,939 | B2 | 4/2011 | Lewis et al. |
| 7,956,102 | B2 | 6/2011 | Lewis et al. |
| 8,101,139 | B2 | 1/2012 | Therriault et al. |
| 8,187,500 | B2 | 5/2012 | Lewis et al. |
| 2003/0114917 | A1 | 6/2003 | Holloway et al. |
| 2010/0330220 | A1 | 12/2010 | Gratson et al. |
| 2012/0231225 | A1* | 9/2012 | Mikulak ............... D01F 8/12 428/172 |
| 2013/0084449 | A1 | 4/2013 | Lewis et al. |
| 2014/0314954 | A1 | 10/2014 | Lewis et al. |
| 2016/0067928 | A1 | 3/2016 | Mark et al. |
| 2016/0297104 | A1 | 10/2016 | Guillemette et al. |

FOREIGN PATENT DOCUMENTS

| | | |
|---|---|---|
| WO | WO 2014/182535 A1 | 11/2014 |
| WO | WO 2014/209994 A2 | 12/2014 |
| WO | WO 2015/069619 A1 | 5/2015 |
| WO | WO 2015/073944 A2 | 5/2015 |
| WO | WO 2015/120429 A1 | 8/2015 |
| WO | WO 2015/120430 A1 | 8/2015 |
| WO | WO 2016/149032 A1 | 9/2016 |

OTHER PUBLICATIONS

Ahn, Bok Y. et al., "Omnidirectional Printing of Flexible, Stretchable, and Spanning Silver Microelectrodes," *Science*, 323 (2009) pp. 1590-1593.
Forward, Keith M., et al., "Production of Core/Shell Fibers by Electrospinning from a Free Surface," *Chemical Engineering Science*, 104 (Dec. 2013) pp. 250-259.
Gratson, Gregory M. et al. "Direct Writing of Three-Dimensional Webs," *Nature*, 428 (2004) p. 386.
Lewis, Jennifer A., "Colloidal Processing of Ceramics," *Journal of the American Ceramic Society*, 83, 10 (2000) pp. 2341-2359.
Lewis, Jennifer A. "Direct Ink Writing of 3D Functional Materials," *Adv. Funct. Mater.*, 16 (2006) pp. 2193-2204.
Therriault, Daniel et al., "Rheological Behavior of Fugitive Organic Inks for Direct-Write Assembly," *Applied Rheology*, 17, 1 (2007) pp. 10112-1-10112-8.
Wu, Willie, et al., "Omnidirectional Printing of 3D Microvascular Networks," *Advanced Materials*, 23, 24 (2011) pp. H178-H183.
Lorang, "Core-Shell Printing of Functional Polymer Filaments," Thesis, Master of Science in Materials Science and Engineering in the Graduate College of the University of Illinois at Urbana-Champaign, 2013, 1-68 pp.
Lee et al., "3D-printed Alginate/Phenamil Composite Scaffolds Constituted with Microsized Core-Shell Struts for Hard Tissue Regeneration," *RSC Adv.* 5, 37 (2015) 29335-29345 (Abstract only).

* cited by examiner

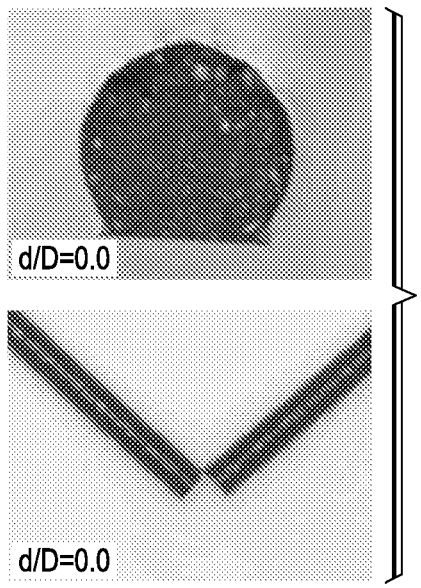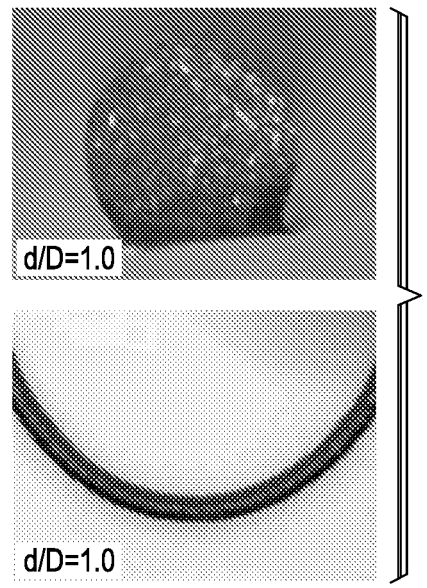
FIG. 7A　　　　　　　　　FIG. 7B
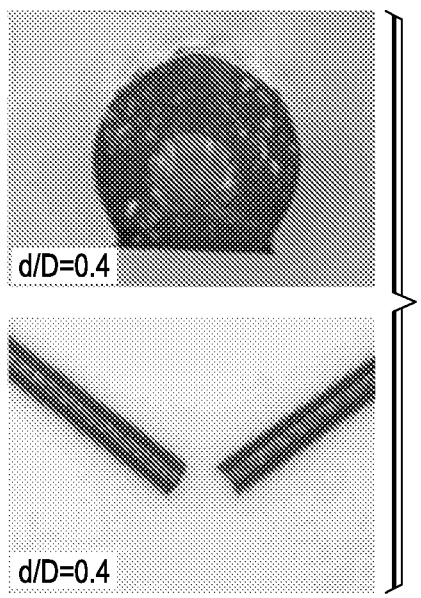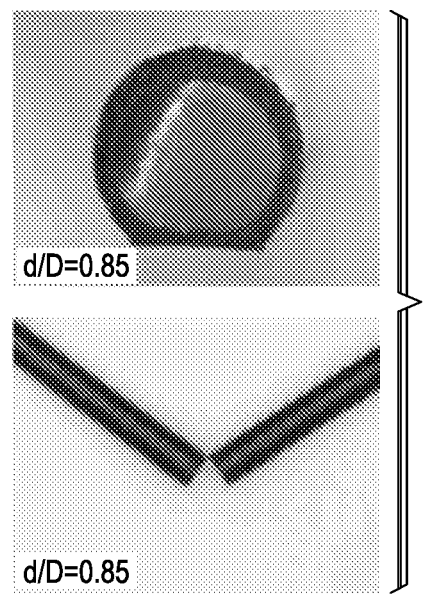
FIG. 8A　　　　　　　　　FIG. 8B

3D PRINTED CORE-SHELL FILAMENT AND METHOD OF 3D PRINTING A CORE-SHELL FILAMENT

RELATED APPLICATIONS

This application is a 371 of PCT/US17/64734 filed Dec. 5, 2017. The present patent document is the U.S. nation stage of International Patent Application No. PCT/US2017/064734, which claims the benefit of priority under 35 U.S.C. § 119(e) to U.S. Provisional Patent Application Ser. No. 62/431,653, filed on Dec. 8, 2016, and to U.S. Provisional Patent Application Ser. No. 62/431,723, filed on Dec. 8, 2016. Both of the aforementioned patent applications are hereby incorporated by reference in their entirety.

TECHNICAL FIELD

The present disclosure is related generally 3D printing and more specifically to 3D printing of core-shell architectures for structural applications.

BACKGROUND

Despite the progress in making stiffer, stronger, and lighter materials, it is still challenging to make engineering materials with high damage tolerance and toughness, which is necessary to prevent premature or catastrophic failure. While high stiffness or toughness can be reached individually, they are typically mutually exclusive. Natural materials partially overcome these limitations by combining different toughening mechanisms across multiple length scales. In bone, for example, fibrillary sliding occurs on the nanometer scale, while crack bridging and crack deflection takes place in the range of tens to hundreds of micrometers.

Besides mechanical properties, effective density is also an important consideration in lightweight structures, both in nature and engineering. Density optimization can be achieved by intelligently distributing materials in a composite system or by removing material at inefficient places. Ordered lattice structures are a special case of the latter and can be tailored to specific requirements to form some of the lightest and strongest structures. Since many energy absorbing mechanisms increase their efficiency with crack length (extrinsic toughening), they are unsuitable for lattice struts, where even slight reductions in the diameter greatly decrease the stiffness. Further, the anisotropic nature of existing, synthetic materials such as nacre is not ideal for lattice struts. While the requirements on the materials are well understood, it remains a challenge to build them. Versatile fabrication methods at the nanoscale exist, but have scalability challenges due to the complexities of producing multi-material, heterogeneous architectures over large scales. More specialized processes, such as freeze casting, are not capable of fabricating lattice geometries.

BRIEF SUMMARY

A 3D printed core-shell filament comprises an elongated core radially surrounded by an outer shell with a barrier layer in between, where the elongated core comprises a ductile polymer and the outer shell comprises a stiff polymer having a Young's modulus higher than that of the ductile polymer.

A method of 3D printing a core-shell filament comprises introducing first, second and third ink formulations into a deposition nozzle comprising a core flow channel radially surrounded by a middle flow channel radially surrounded by an outer flow channel. The first ink formulation flows through the core flow channel, the second ink formulation flows through the middle flow channel, and the third ink formulation flows through the outer flow channel. A continuous filament comprising the first, second, and third ink formulations is deposited on a substrate. The continuous filament comprises an elongated core radially surrounded by an outer shell with a barrier layer in between, where the elongated core comprises the first ink formulation, the barrier layer comprises the second ink formulation, and the outer shell comprises the third ink formulation. The first, second and third ink formulations are cured, thereby forming a ductile polymer from the first ink formulation, a barrier polymer from the second ink formulation, and a stiff polymer having a Young's modulus higher than that of the ductile polymer from the third ink formulation.

A lightweight structural component comprises a lattice structure including a plurality of 3D printed core-shell filaments, where each 3D printed core-shell filament comprises an elongated core radially surrounded by an outer shell with a barrier layer in between. The elongated core comprises a ductile polymer and the outer shell comprises a stiff polymer having a Young's modulus higher than that of the ductile polymer.

BRIEF DESCRIPTION OF THE DRAWINGS

FIG. 7A shows cross-sectional and side view photographs (top and bottom, respectively) of a filament having a d/D ratio=0 after three-point bend testing.

FIG. 7B shows cross-sectional and side view photographs (top and bottom, respectively) of a filament having a d/D ratio=1 after three-point bend testing.

FIG. 8A shows cross-sectional and side view photographs (top and bottom, respectively) of a core-shell filament having a d/D ratio=0.4 after three-point bend testing. The core-shell filament in this example does not include a barrier layer between the elongated core and the outer shell.

FIG. 8B shows cross-sectional and side view photographs (top and bottom, respectively) of a core-shell filament having a d/D ratio=0.85 after three-point bend testing. The core-shell filament in this example does not include a barrier layer between the elongated core and the outer shell.

DETAILED DESCRIPTION

Figure 1:
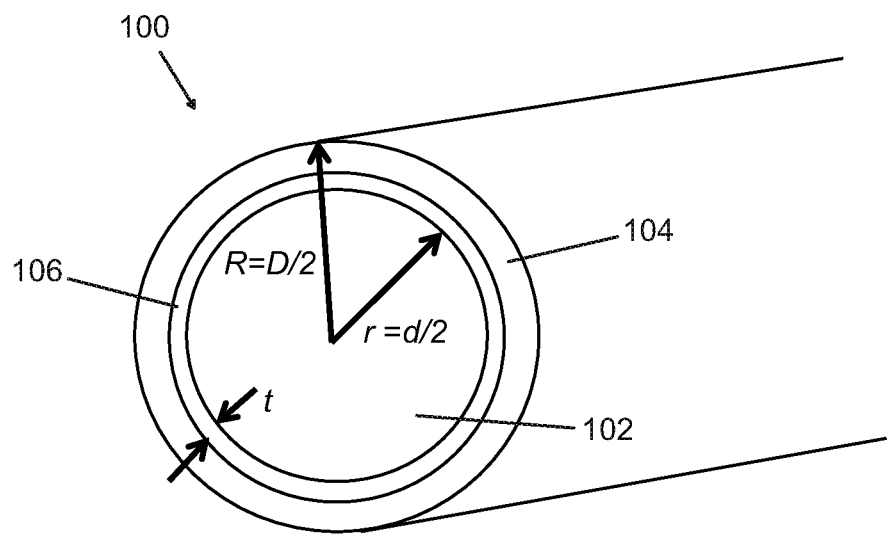
FIG. 1 is a schematic of an exemplary 3D printed core-shell filament.

A method to fabricate stiff and tough materials that can be used to build lattice structures or other lightweight structures is described herein. The method is enabled by direct ink writing, an extrusion-based 3D printing technique that allows continuous, core-shell filaments with an engineered core and one or more overlying shells to be fabricated from a wide variety of materials. Such core-shell filaments could serve as struts for stiff and tough lightweight structures. FIG. 1 is a schematic of an exemplary core-shell filament that combines a flexible core with a brittle shell and an interfacial layer in between that can prevent or inhibit diffusion and crack propagation. Described below are 3D printed core-shell filaments optimized for high stiffness, strength and energy absorption, and lightweight structures fabricated from such filaments.

Figure 2:
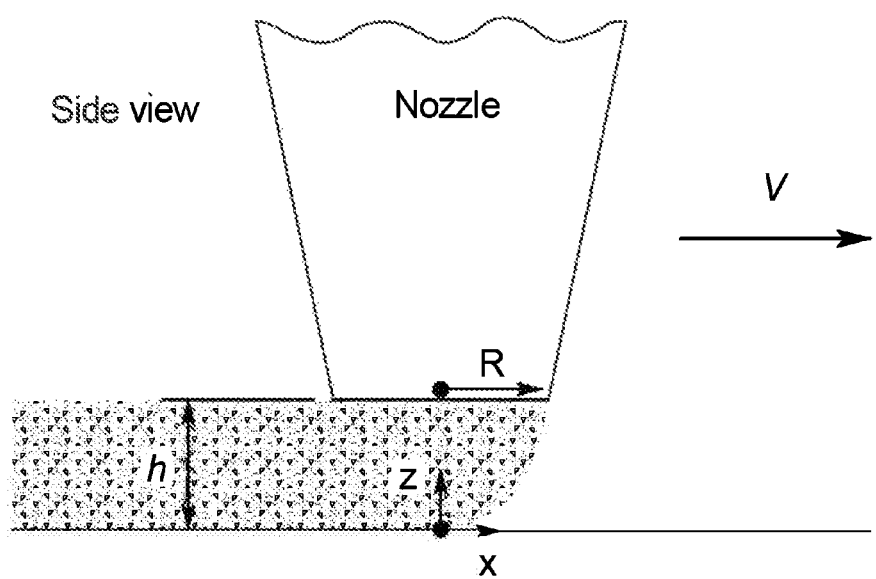
FIG. 2 is a schematic of an exemplary 3D printing process.

FIG. 2 is a schematic of an exemplary 3D printing process, which may also be referred to as direct ink writing or direct write fabrication. Ink formulations that are suitable for 3D printing can be readily extruded through a deposition nozzle to form a continuous filament that maintains its shape once deposited. As shown in FIG. 2, the deposited filament may have a sufficient stiffness to retain its shape and a height h. During printing, the deposition nozzle can be moved at a constant or variable print speed V while the substrate remains stationary. Alternatively, the substrate may be moved while the deposition nozzle remains stationary, or both the deposition nozzle and the substrate may be moved. One or more continuous filaments can be deposited on the substrate in a predetermined 2D or 3D pattern. Using this approach, 3D structures having a wide range of geometries—from lattice structures to solid bodies—may be built up layer by layer. The substrate is typically a solid, but 3D printing may alternatively be carried out using a gel or viscous liquid as a substrate. The one or more continuous filaments may be heated or otherwise processed after extrusion and/or deposition to cure the ink formulation(s), increasing the stiffness of the deposited filament and allowing for formation of a rigid printed structure.

The core-shell filament or strut 100 shown in FIG. 1 includes an elongated core 102 radially surrounded by an outer shell 104. An interfacial or barrier layer 106 is disposed between the elongated core 102 and the outer shell 104. The elongated core 102 comprises a ductile polymer and the outer shell comprises a stiff polymer having a Young's modulus higher than that of the ductile polymer. A stiffer polymer is employed for the outer shell 104 than for the elongated core 102 since the stiffness of the filament 100 is proportional to the cube of the filament diameter, $D^3$, and the elongated core 102 may be optimized for toughness. Preferably, the Young's modulus of the stiff polymer is significantly higher than that of the ductile polymer (e.g., at least twice as high). For example, the stiff polymer may have a Young's modulus of at least about 4 GPa, while the ductile polymer may have a Young's modulus of about 2 GPa or less.

It is also contemplated that one or both of the elongated core 102 and the outer shell 104 may have a gradient in composition along a given direction (e.g., radial direction, length direction). The gradient in composition may be a discrete or continuous gradient. To achieve such a gradient, more than one stiff polymer may be used to form the outer shell 104 and/or more than one ductile polymer may be used to form the elongated core 102, where the direction of the gradient (e.g., radial or length direction) may be controlled by the flow of ink during 3D printing. Consequently, the core-shell filament 100 may exhibit a gradient in stiffness and possibly other mechanical properties along a given direction (e.g., the direction of the composition gradient).

It may be beneficial in some applications for the core-shell filament 100 to include a soft external layer on the outer shell 104. Such a soft external layer may help to reduce or eliminate stress concentrations in the outer shell 104. The soft external layer may comprise a soft polymer having a lower Young's modulus than the stiff polymer of the outer shell 104.

The elongated core 102 has diameter d, or more generally speaking, a width d, and the outer shell 104 has a diameter or width D. The outer shell 104 radially surrounds the elongated core 102 along an entirety or at least a portion of the length of the core-shell filament 100. In some applications, such as where reduced weight is critical, the elongated core 102 may radially surround a hollow inner core, such that the core-shell filament 100 is hollow. The barrier layer may extend over all or at least a portion of the length of the core-shell filament. The thickness t of the barrier layer 106 is typically at least about 10 times smaller than D. In one example, the thickness t of the barrier layer 106 is from about 10 microns to about 50 microns, while d is typically in the range from about 100 microns to about 500 microns and D is typically in the range from about 400 microns to about 1 mm.

Suitable stiff and ductile polymers for the outer shell and elongated core may include epoxies, for example, where the variation in stiffness may come from the use of different polymers, curing agents, fillers and/or the use of different amounts or types of reinforcement particles. Besides influencing the mechanical properties of the 3D printed filament, reinforcement particles may affect the rheology of the ink formulations employed for 3D printing. Suitable stiff polymers may include, in addition to epoxy, vinylester, polyester (EP) and/or polymethyl methacrylate (PMMA). Suitable ductile polymers, besides epoxy, may include polyurethane (PU), thermoplastic polyurethane (TPU) and/or polycarbonate (PC). Exemplary reinforcement particles include clay platelets, oxide particles, carbon-based particles (e.g., carbon fibers, carbon nanofibers, carbon nanotubes and carbon nanowires), cellulose fibrils and polymer particles. Suitable oxide particles may include, for example, silica and alumina, and the polymer particles may comprise rubber or core-shell rubber particles, for example. Typically, the reinforcement particles have at least one dimension in the nano- or microscale range (e.g., from about 1 nm to 500 nm, or from greater than 0.5 μm to about 500 μm), and thus the reinforcement particles may be referred to as nanoscale or microscale reinforcement particles. In one example, the stiff polymer may comprise an epoxy that includes nanoscale clay platelets for enhanced stiffness and suitable rheological properties. The ductile polymer may also comprise an epoxy, and oxide particles and/or polymer particles may be used as the reinforcement particles.

Figure 3A:
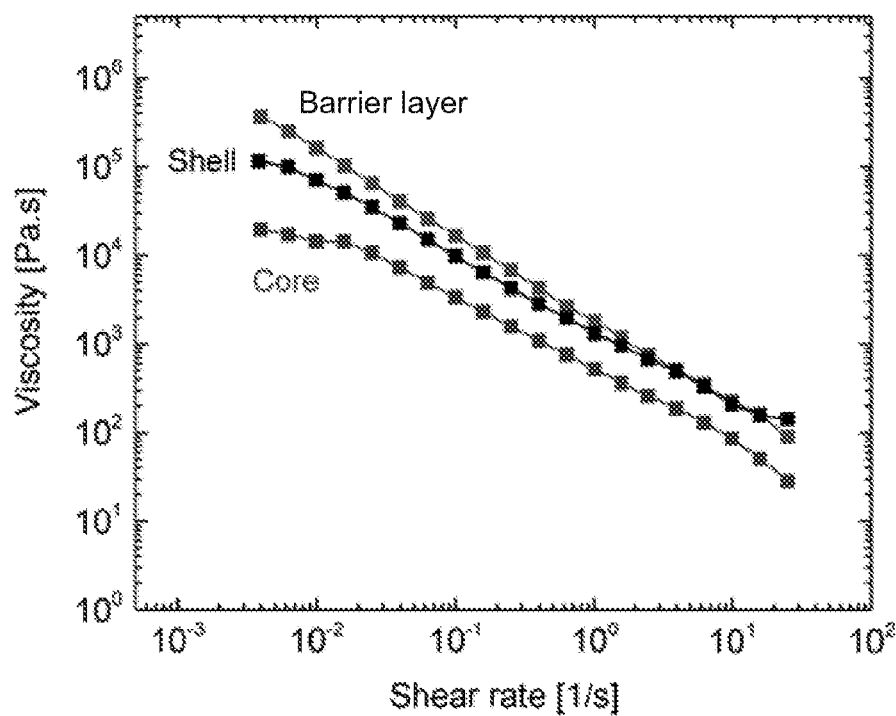
FIGS. 3A and 3B show the rheological properties of three exemplary ink formulations that can be used to form the elongated core, barrier layer and outer shell of a 3D printed core-shell filament.
Figure 3B:
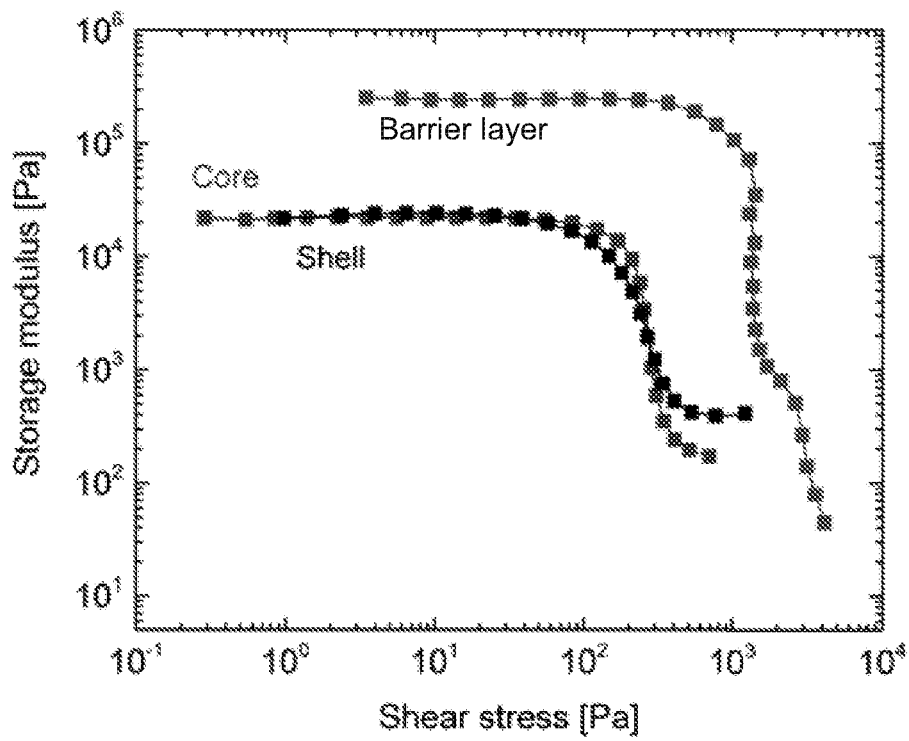

Advantageously, the ink formulations used to 3D print the core-shell filaments are engineered to be viscoelastic with a strain-rate dependent viscosity. More specifically, the ink formulations may be shear-thinning, a characteristic that provides low viscosity at high shear rates (e.g., while passing through the deposition nozzle) and high viscosity at low shear rates (e.g., when deposited on a substrate). FIGS. 3A and 3B show the rheological properties of three exemplary ink formulations that can be used to form the outer shell, elongated core and barrier layer of a 3D printed core-shell filament. The ink formulations may comprise polymer precursors suitable for forming the desired polymers upon curing and may optionally comprise other additives, such as reinforcement particles as discussed above, dispersants, curing agents, and/or solvents known in the art.

The barrier layer may comprise a polymer (a "barrier polymer") having a high coefficient of friction with respect to the ductile and stiff polymers. For example, the barrier polymer may exhibit a coefficient of friction of greater than 1 with respect to each of the ductile and stiff polymers of the elongated core and outer shell, respectively. Suitable polymers for the barrier layer may comprise silicone, polytetrafluoroethylene (PTFE) and/or another polymer that does not bond to the ductile and stiff polymers. It is strongly preferred that the barrier polymer does not bond to the ductile and stiff polymers and provides structural stability to the elongated filament. The role of the barrier layer to prevent bonding between the polymers of the elongated core and the outer shell is particularly important if the ductile and stiff polymers comprise the same base material (e.g., epoxy). Another benefit of the barrier layer is to inhibit diffusion between the ductile and stiff polymers.

Figure 4:
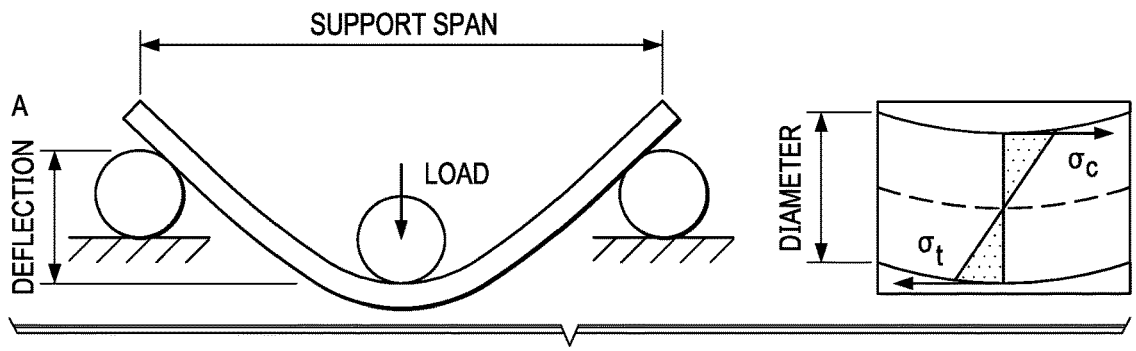
FIG. 4 illustrates three-point bend tests that can be carried out on 3D printed core-shell filaments.
Figure 5A:
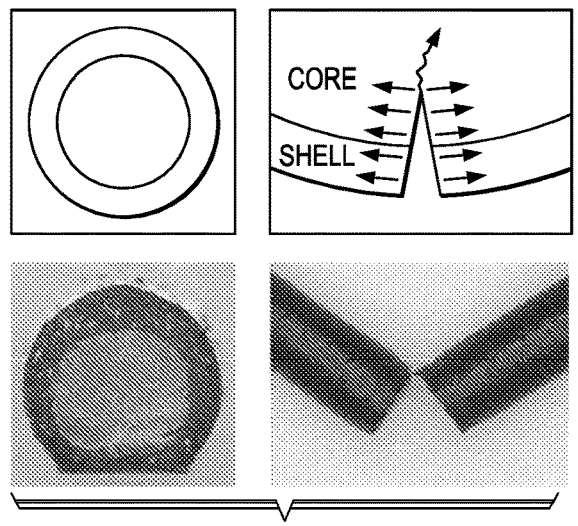
FIG. 5A shows cross-sectional and side view schematics and photographs (top and bottom, respectively) of a core-shell filament without a barrier layer after three-point bend testing.
Figure 5B:
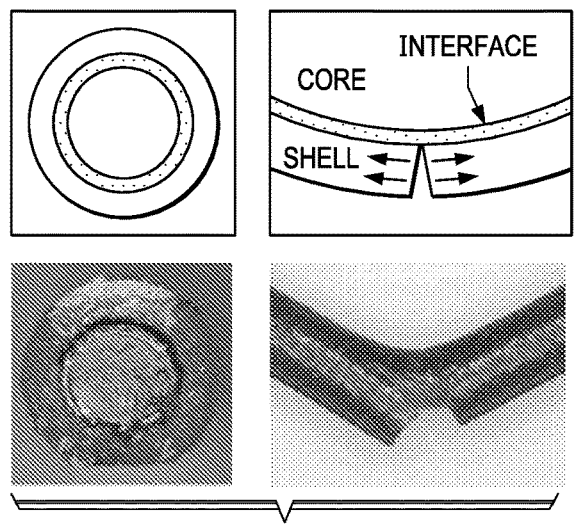
FIG. 5B shows cross-sectional and side view schematics and photographs (top and bottom, respectively) of a core-shell filament with a barrier layer after three-point bend testing.

Given these characteristics, any reduction in stiffness attributable to the presence of the barrier layer may be diminished. In fact, as shown by mechanical test data, the stiffness of a core-shell filament including a barrier layer may be increased relative to core-shell filaments that do not include such a barrier layer. Three-point bend tests, carried out as shown schematically in FIG. 4, reveal the impact of the barrier layer on the mechanical properties of 3D printed core-shell filaments. Without a barrier layer, the core-shell struts fail completely upon crack initiation, as shown in FIG. 5A, while the core-shell struts with the barrier layer remain partially intact, as shown in FIG. 5B.

Despite these results, it is contemplated that in some cases a barrier layer may not be needed. For example, if the ductile polymer of the elongated core does not bond to the stiff polymer selected for the outer shell, then the core-shell filament may be fabricated without a barrier layer. Also, if the ductile and stiff polymers could be separated during curing with, for example, a sacrificial layer that is removed (e.g., vaporized) during curing, then a barrier layer may not be required.

A ratio of the diameter d of the elongated core to the diameter D of the outer shell may have a significant impact on the mechanical properties of the core-shell filament, particularly energy absorption. Experiments reveal that filaments having a ratio d/D from about 0.8 to about 0.9 (e.g., 0.85) exhibit a substantial increase in energy absorption compared to other ratios of d/D, with only a marginal decrease in stiffness. Preferably, d/D is at least about 0.6, at least about 0.7 or at least about 0.8, and may be as high as 0.9.

Figure 6:
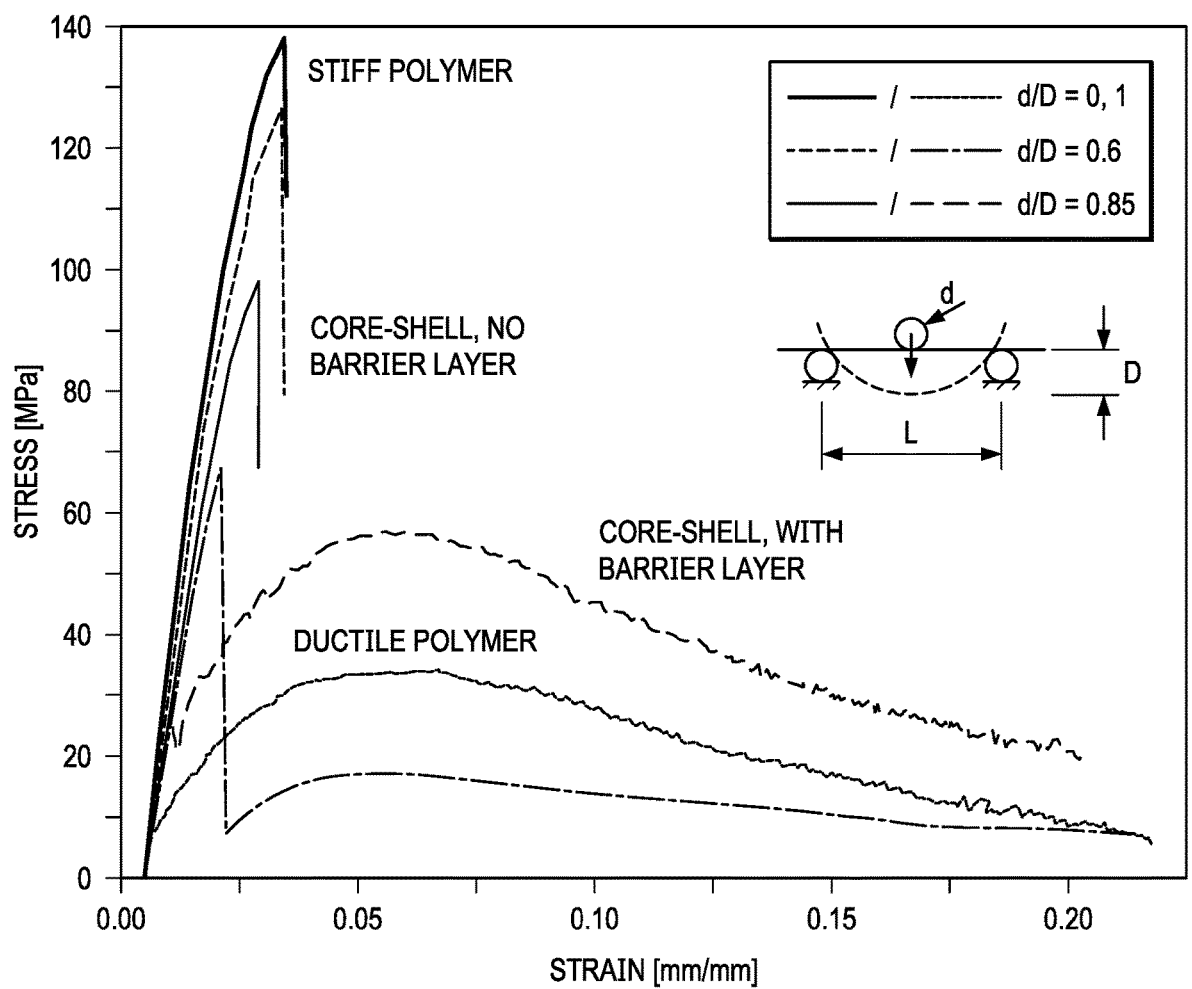
FIG. 6 shows stress-strain curves obtained from bend tests of single-material filaments (stiff polymer, ductile polymer) in comparison with core-shell filaments (stiff polymer shell with ductile polymer core) that include and do not include a barrier layer.

FIG. 6 shows stress-strain curves obtained from bend tests of single-material filaments (stiff polymer, ductile polymer) in comparison with core-shell filaments (stiff polymer shell with ductile polymer core) that include and do not include a barrier layer. The ductile polymer in these examples is a ductile epoxy exhibiting a Young's modulus of less than 20 GPa, while the stiff polymer is a stiff epoxy exhibiting a Young's modulus in excess of 40 GPa. The characteristics of the stress-strain curves of the core-shell filament with no barrier layer are similar to that of the stiff epoxy; both exhibit a high modulus and rapid fracture after exceeding the strength of the filament. A cross-sectional view of the fracture surface and side view of the fractured filament are shown in FIG. 7A for the stiff polymer, and the same views of the core-shell filament with no barrier layer are shown in FIGS. 8A and 8B for different ratios of d/D (0.4 and 0.85). The length of the scale bars is 200 μm. A larger core decreases the stiffness and strength, as revealed in the stress-strain curve of FIG. 6, but is not able to stop the crack.

Figure 9A:
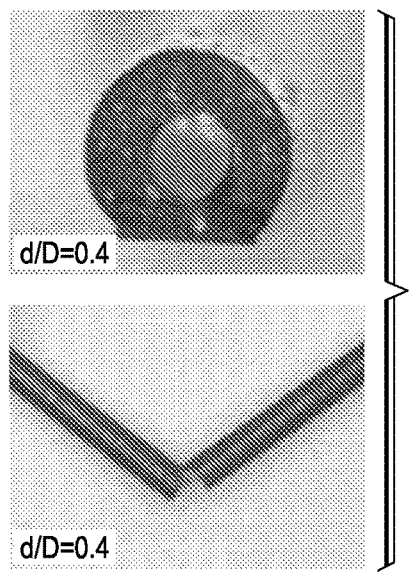
FIG. 9A shows cross-sectional and side view photographs (top and bottom, respectively) of a core-shell filament having a d/D ratio=0.4 after three-point bend testing. The core-shell filament in this example includes a barrier layer between the elongated core and the outer shell.
Figure 9B:
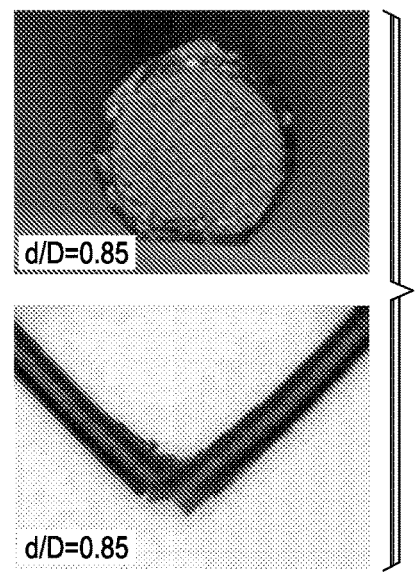
FIG. 9B shows cross-sectional and side view photographs (top and bottom, respectively) of a core-shell filament having a d/D ratio=0.85 after three-point bend testing. The core-shell filament in this example includes a barrier layer between the elongated core and the outer shell.

For the core-shell filament with the barrier layer, the stiffness and strength are reduced compared to the core-shell filament with no barrier layer, but the interfacial layer stops the crack propagation and the core is capable of holding the load up, as shown by the data in FIG. 6 for a d/D ratio of 0.6 and 0.85. Cross-sectional and side views of the filaments after testing are shown in FIGS. 9A and 9B for d/D ratios of 0.4 and 0.85. The piecewise failure that occurs at larger d/D ratios is shown in the stress-strain data as many small decreases in stress instead of a single large drop, which enhances the energy absorption compared to the other filaments investigated, including the pure ductile polymer, which is shown in the images of FIG. 7B.

Figure 10A:
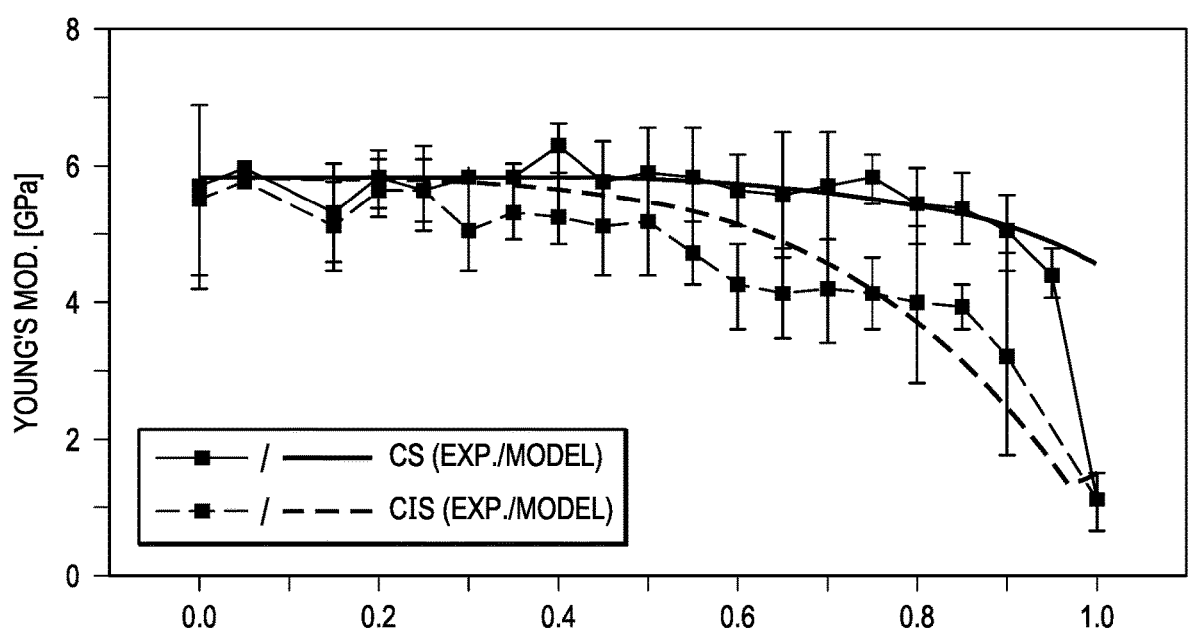
FIGS. 10A-10C show Young's modulus, ultimate tensile strength (UTS) and energy absorption for 3D printed filaments with and without a barrier layer as a function of d/D ratio from 0 (corresponding to the stiff polymer) to 1 (corresponding to the ductile polymer).
Figure 10B:
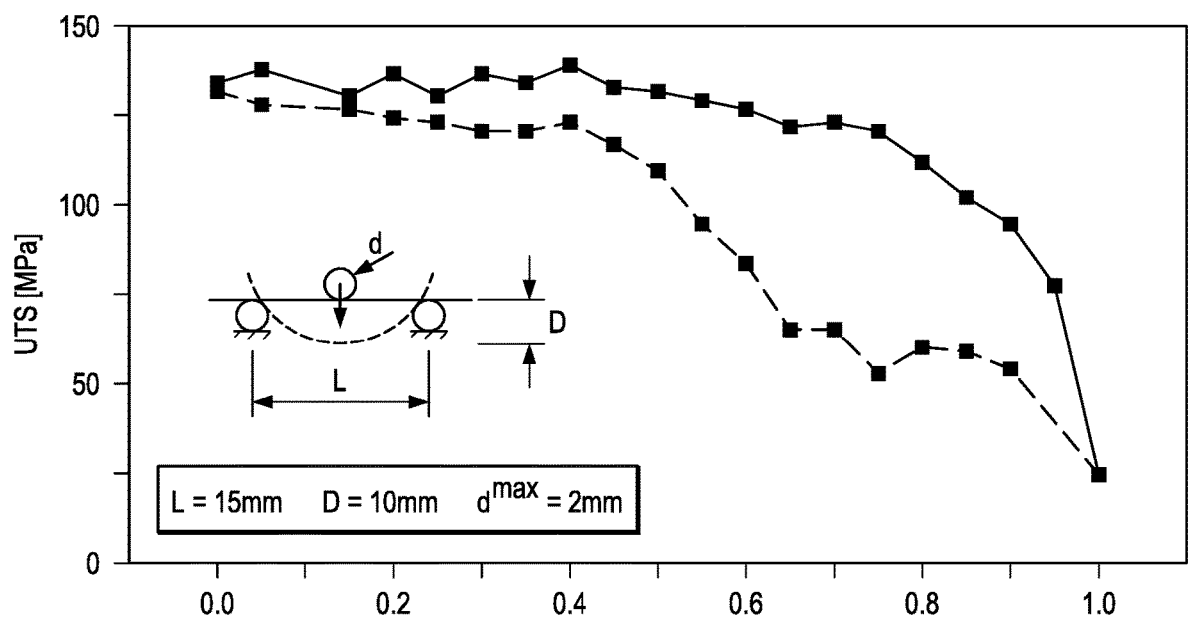
Figure 10C:
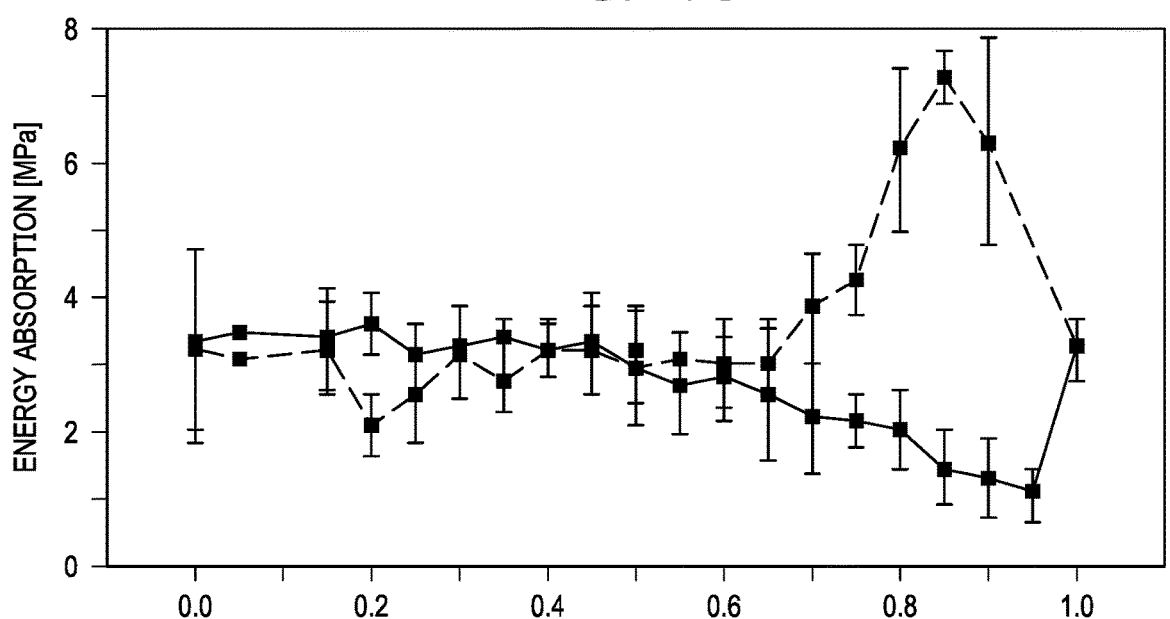

FIGS. 10A-10C show the Young's modulus, ultimate tensile strength (UTS) and energy absorption over a d/D ratio from 0 (corresponding to the stiff polymer) to 1 (corresponding to the ductile polymer). This systematic study of the effect of the d/D ratios reveals that, at ratios between 0.8 and 0.9, an energy absorption more than 100% higher than that obtained at ratios of 0 and 1 is reached, despite a decline in Young's modulus and strength.

Looking first at FIG. 10A, the Young's modulus data for both the core-shell filament without a barrier layer ("CS strut") and the core-shell filament with a barrier or interfacial layer ("CIS strut") initially plateau at around 6 GPa, close to the property measured for the stiff material, as shown in FIG. 9A. As the ductile polymer of the core gains in significance, at d/D=0.5, the values of both data sets start to decrease to around 1.5 GPa, which corresponds to the stiffness of the ductile polymer. The values of the curves then increasingly deviate from each other. This may be attributable to the core of the CS being strengthened near the interface, while the core of the CIS is not. Also, the interfacial layer of the CIS increases in cross-sectional area and impact towards the higher d/D ratios. The larger deviations of the CIS struts are due to additional measurement, analysis, and rounding errors.

For the UTS data shown in FIG. 10B, the trend is similar: a plateau at about 135 MPa decreases to 40 MPa with an increasing slope. Both the Young's modulus and UTS contribute to the energy absorption, and indeed, in the first half of the plot, there is little difference between the curves. At higher ratios, the stiffness and strength are dominant in the CS struts. For the CIS struts, even at ratios below 0.5, the stiffness and strength are significantly lower than those of the CS struts. A similar energy absorption is reached through the increasing contribution of the core that keeps the stress level up after the initial failure of the shell. Up to d/D=0.6, the described effects mostly cancel each other out. Then, for the CS struts, the influence of the core increases and reduces the stiffness and strength, while the energy absorption rises. After crack initiation, the crack travels through the whole strut, and even large cores are not able to stop it. For the CIS struts, the effect is opposite: at a ratio d/D=0.6, the energy absorption drastically increases to more than double the level of the ductile polymer at about d/D=0.85. Thus, factors other than the ductile core material come into play. Due to the thinner shell in combination with imperfections, the crack now fractures the shell piecewise, as seen in the stress-strain data of FIG. 6. The shell continues to maintain stability even after multiple crack insets. Additionally, the creation of all the new surfaces absorbs additional energy. A similar phenomenon in natural composite materials, in which the composite performs better than the individual constituent materials, is observed, for example, in bone and nacre.

Figure 11:
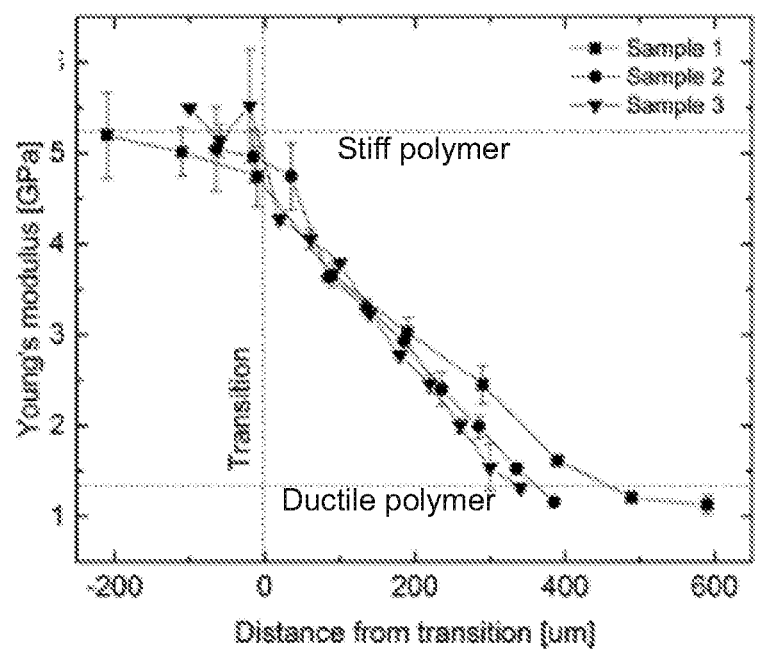
FIG. 11 shows data from nanoindentation hardness testing across a core-shell filament cross-section, revealing a transition region created by interdiffusion between the outer shell and the elongated core (without the barrier layer).

The CS struts, while not fabricated to include a barrier layer, may include a transition region created by interdiffusion between the outer shell and the elongated core. Nanoindentation hardness testing is used to measure the transition region, as shown by the data of FIG. 11. While the stiff polymer is mostly unaffected, an increased stiffness is found in the ductile polymer near the interface that linearly decreases toward the level of the ductile polymer within a distance of about 400 µm. The barrier layer employed in the CIS struts inhibits the diffusion that can otherwise occur during 3D printing and/or curing of the CS struts.

Figure 12A:
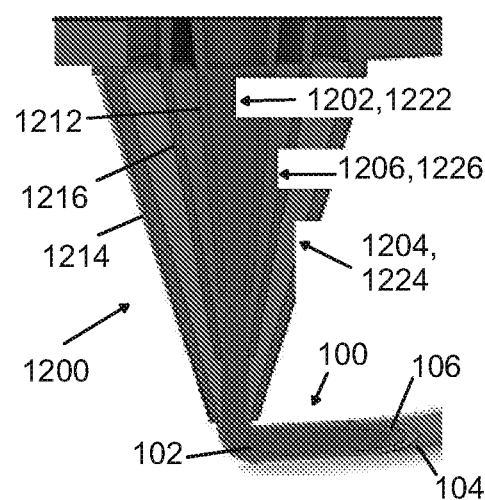
FIGS. 12A and 12B show schematics of exemplary deposition nozzles (during printing in the case of FIG. 12A, and prior to printing in the case of FIG. 12B).
Figure 12B:
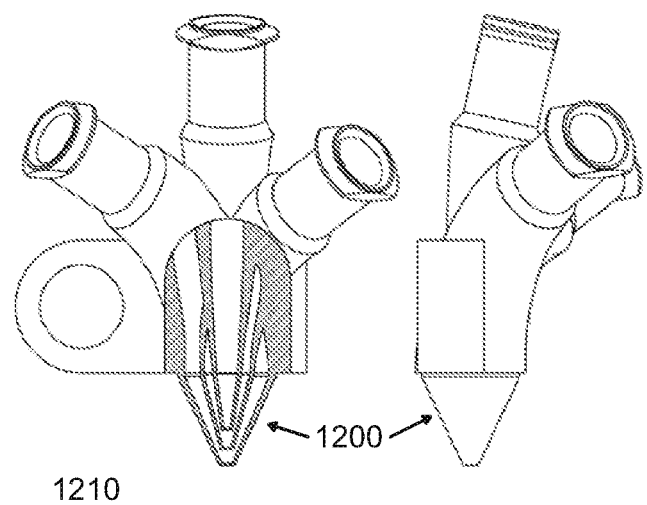

A method of printing the core-shell filaments described in this disclosure is set forth now in reference to FIGS. 12A and 12B, which show schematics of exemplary deposition nozzles (during printing in the case of FIG. 12A, and prior to printing in the case of FIG. 12B). The method entails introducing first, second and third ink formulations into a deposition nozzle 1200 comprising a core flow channel 1202 radially surrounded by a middle flow channel 1206 radially surrounded by an outer flow channel 1204. The core, middle and outer flow channels 1202,1206,1204 are radially enclosed by walls 1212,1216,1214 of the deposition nozzle. The first ink formulation 1222 flows through the core flow channel 1202, the second ink formulation 1226 flows through the middle flow channel 1206, and the third ink formulation 1224 flows through the outer flow channel 1204. A continuous filament 100 comprising the first, second and third ink formulations 1222,1226,1224 is deposited on a substrate 1210, where the continuous filament comprises an elongated core 102 radially surrounded by an outer shell 104 with a barrier layer 106 in between. The elongated core 102 comprises the first ink formulation 1222, the barrier layer 106 comprises the second ink formulation 1226, and the outer shell 104 comprises the third ink formulation 1224. The first, second and third ink formulations 1222,1224,1226 are cured to form a ductile polymer from the first ink formulation, a barrier polymer from the second ink formulation, and a stiff polymer having a Young's modulus higher than that of the ductile polymer from the third ink formulation.

The deposition nozzle may further include an inner flow channel radially surrounded by the core flow channel, and the method may further comprise introducing a fugitive ink formulation into the deposition nozzle, such that the fugitive ink formulation flows through the inner flow channel. In this case, the continuous filament deposited on the substrate comprises the fugitive, first, second and third ink formulations, and the elongated core that comprises the first ink formulation radially surrounds a fugitive inner core that comprises the fugitive ink formulation. After deposition of the continuous filament, the fugitive ink formulation is removed from the fugitive inner core, and thus a hollow inner core may be formed. The removal of the fugitive ink formulation to form the hollow inner core may occur after the curing of the first, second and third ink formulations to form the ductile polymer, the barrier polymer and the stiff polymer, respectively. This may be preferred to enhance the mechanical integrity of the hollow core-shell filament prior to removing the fugitive ink formulation.

The deposition nozzle may also or alternatively include an external flow channel that radially surrounds the outer flow channel, and the method may further entail introducing a soft shell ink formulation into the deposition nozzle, such that the soft shell ink formulation flows through the external flow channel. In this example, the continuous filament comprises the first, second, third and soft shell ink formulations, and the outer shell comprising the third ink formulation is radially surrounded by a soft external layer comprising the soft shell ink formulation. During the curing of the first, second and third ink formulations, the soft shell ink formulation may also be cured to form a soft polymer having a Young's modulus lower than that of the stiff polymer. This configuration may help to reduce stress concentrations in the stiff outer shell.

As would be recognized by one of ordinary skill in the art, additional flow channels and/or alternating flows may be employed to incorporate additional ink formulations into the outer shell and/or the elongated core of the core-shell filament, thereby producing a composition gradient in the outer shell and/or elongated core upon curing.

Prior to curing, the fugitive, first, second, third, and/or soft shell ink formulations may comprise polymer precursors corresponding to the desired polymers and optionally may comprise other additives, such as dispersants, curing agents, solvents, and/or the reinforcement particles described above.

For cylindrical filaments, as shown in the figures, the outer shell 104 may be a tubular shell and the elongated core 102 may be a cylindrical core, but other shapes (e.g., oval, irregular, rectangular, pentagonal, hexagonal, etc.) are contemplated, depending on the deposition nozzle geometry. It is understood that the deposition nozzle includes at least the core, middle and outer flow channels shown in FIGS. 12A and 12B and may further include additional flow channels. Accordingly, the continuous filament having the core-shell structure may include multiple shells (e.g., the outer shell and one or more inner shells).

3D printing may be carried out at ambient or room temperature conditions (e.g., from about 18° C. to about 25° C.). If a thermoplastic polymer is employed for one or more of the ink formulations, printing may take place at a temperature above the melting point of the polymer (e.g., from about 80° C. to about 300° C.). The deposition nozzle may be moved and the continuous core-shell filament may be deposited at print speeds as high as about 3 m/s, although more typical print speeds range from about 10 micron/s to about 500 mm/s, from about 100 micron/s to about 100 mm/s, or from about 1 mm/s to about 10 mm/s. The deposition nozzle may be microscale in size with an inner diameter or width ranging from about 1 micron to about 1,000 microns (1 mm), and more typically from about 10 microns to 500 microns. Depending on the nozzle size as well as the injection pressure and nozzle translation speed, the extruded filament may have a width or diameter ranging from about 1 micron to about 1 mm, and more typically from about 10 microns to about 500 microns.

To improve the 3D printing process, the channels may have a longitudinally retracted arrangement within the deposition nozzle, as described in detail in U.S. Provisional patent application Ser. No. TBD, entitled "Core-Shell Nozzle for Three-Dimensional Printing and Method of Use," (inventors: Jennifer A. Lewis, Jochen Mueller and Jordan R. Raney), filed in December, 2016, and hereby incorporated by reference in its entirety. Referring again to FIG. 12A, an outlet of the core flow channel 1202 may be longitudinally retracted compared to an outlet of the middle flow channel 1206, such that the second ink formulation 1226 flows over the first ink formulation 1222 prior to exiting the outlet of the middle flow channel 1206, and the outlet of the middle flow channel 1206 may be longitudinally retracted compared to an outlet of the outer flow channel 1204, such that the third ink formulation flows 1224 over the second ink formulation 1226 prior to exiting the outlet of the outer flow channel 1204. This retracted channel design may allow for an improvement in the printing resolution. Also or alternatively, the core, middle and/or outer channels 1202,1206, 1204 may have a tapered shape, where each channel extends from a larger diameter to a smaller diameter in a direction of the outlet, as can be seen in FIGS. 12A and 12B.

The deposition nozzle itself may be fabricated via 3D printing. In addition to providing a facile, programmable way to determine coaxial alignment of the flow channels, the automated assembly of highly-reproducible deposition nozzles from inexpensive materials allows them to be produced in bulk and thus to be treated as a consumable. In addition, layer-by-layer fabrication of the deposition nozzles allows for tapering of the flow channels as described above, which can reduce the pressure required to extrude high viscosity or reinforcement particle-filled ink formulations through the flow channels. Reservoirs holding the ink formulations may be connected to the deposition nozzle via a standardized Luer lock that can be directly printed with the deposition nozzle.

The continuous core-shell filament deposited on the substrate may be understood to encompass a single continuous filament of a desired length or multiple extruded filaments having end-to-end contact once deposited to form a continuous filament of the desired length. In addition, two or more continuous filaments in a given layer of a structure may be spaced apart, as end-to-end contact may not be required. A continuous filament of any length may be produced by halting deposition after the desired length of the continuous filament has been reached. The desired length may depend on the print path and/or the geometry of the structure being fabricated.

During or after extrusion from the deposition nozzle, and typically after deposition on the substrate, the continuous filament may be exposed to heat, ultraviolet light or a chemical curing agent to induce curing of the first, second, and/or third ink formulations, thereby stiffening the continuous filament for use as a strut or other structural component of a 3D body.

Figure 13A:
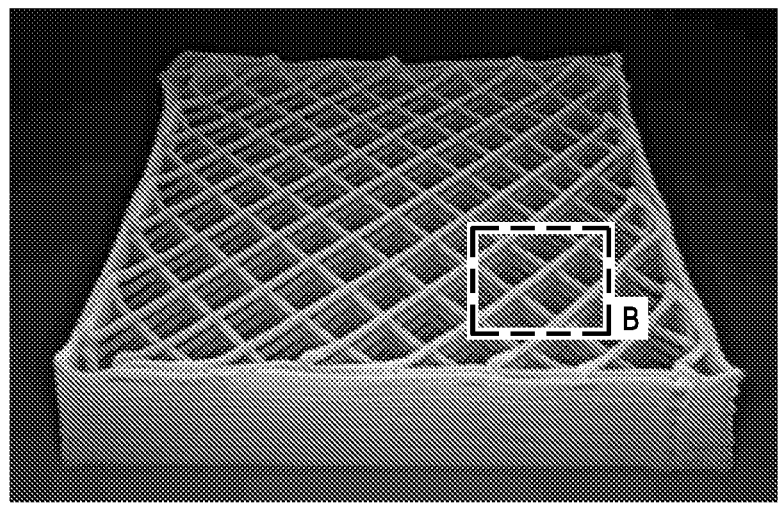
FIGS. 13A and 13B show scanning electron microscope images of a 3D printed lattice structure.
Figure 13B:
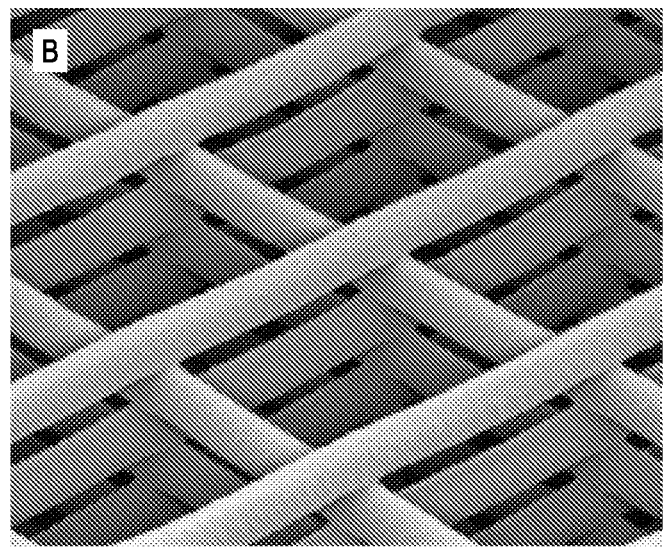

A lightweight structural component may be formed from a lattice or other structure comprising a plurality of 3D printed core-shell filaments (or struts) arranged in layers, as shown in FIGS. 13A and 13B. It is understood that the filaments of a given layer of the lattice may have an angular offset (or nonparallel relationship) with the filaments of underlying and overlying layers of the lattice, but the filaments from adjacent layers need not have a perpendicular relationship, as shown in the example of FIGS. 13A and 13B. As described in detail above, each 3D printed core-shell filament comprises an elongated core radially surrounded by an outer shell with a barrier layer in between. The elongated core comprises a ductile polymer and the outer shell comprises a stiff polymer having a Young's modulus higher than that of the ductile polymer. The 3D printed core-shell filaments of the lightweight structural component may have any of the characteristics described in this disclosure. In some applications, it may be advantageous for all of the 3D printed core-shell filaments to comprise the same ductile polymer, the same stiff polymer, and the same barrier polymer, forming a uniform lattice or other structure. Alternatively, 3D printing allows for fabrication of a lattice or other structure where at least one of the 3D printed core-shell filaments comprises a different ductile polymer, a different stiff polymer and/or a different barrier polymer than another of the 3D printed core-shell filaments. Also, the spacing of the filaments in the lattice structure may be regular or irregular, depending on the desired application.

Spanning (unsupported) features of the 3D printed lattice or other structures are enabled by the storage moduli of the ink formulations (e.g., see FIG. 3B). The joints may be sufficiently rigid to prevent free rotation of the struts, which allows applied loads to induce bending moments that exploit the struts' energy absorption capabilities. Side walls of exemplary lattice structures are printed, as shown in FIG. 13A, to provide structural stability during the printing process, but the walls can be removed after curing (e.g., to avoid boundary effects during mechanical tests).

Figure 14:
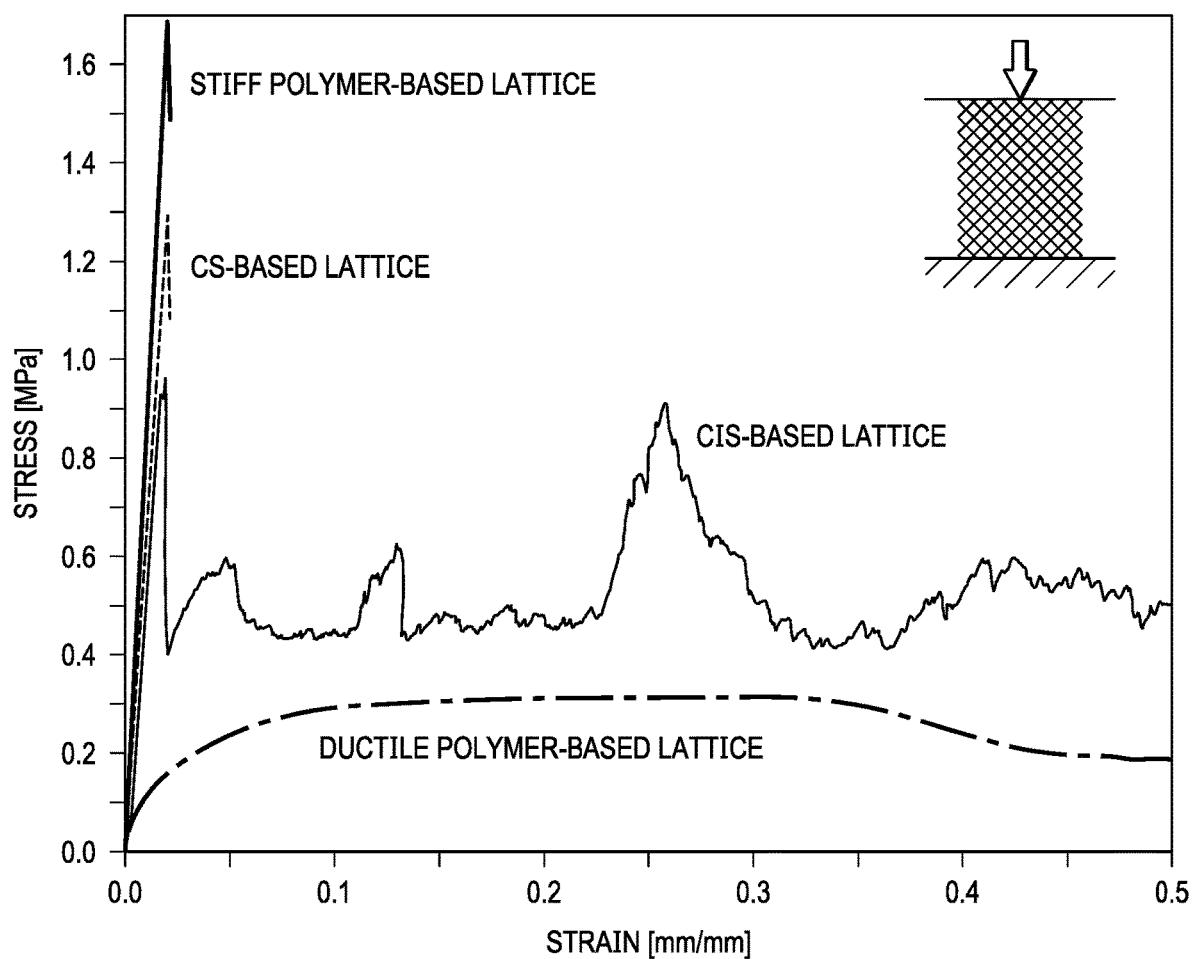
FIG. 14 shows stress-strain curves generated from compression experiments carried out on exemplary 3D printed lattices.

Lattice structures fabricated from 3D printed core-shell filaments are tested to evaluate their mechanical properties. The exemplary lattice structures are compressed, as shown schematically by the inset of FIG. 14, and the results are normalized for relative density. In the CIS-based lattice structures, the layers fail along one diagonal first, followed by the collapse of the inverse diagonal layers—a behavior typical for elastoplastic materials of that unit cell type. As observed previously, the shell fractures into pieces while the core remains intact.

In contrast to the CIS-based lattice, both the stiff polymer-based lattice and the CS-based lattice collapse completely and release sufficient energy to catapult themselves out of the test rig. The ductile polymer-based lattice does not show any layer effect or failure. After about 0.3 strain, global out-of-plane buckling occurs, which is due to the specific lattice dimensions. Comparing the options, the CIS-based lattice structure shows superior energy absorption capabilities. As found in the bending experiments carried out on single struts, the modulus of the CIS-based lattice is slightly lower compared to that of the stiff polymer-based and CS-based lattices, but significantly higher than that of the ductile polymer-based lattice.

As shown in this disclosure, a 3D printing method that enables the fabrication of lightweight structures that exhibit high stiffness along with high toughness—an effect observed in nature and of great importance in countless engineering applications—has been developed. The 3D printed structures can provide more efficient and safer solutions in a wide range of applications, such as sports and transportation.

Experimental Section

Ink Synthesis:

The inks for the core and shell materials are prepared by mixing batches of 10 g to 60 g of Epon 826 or Epon 872 (Momentive Performance Materials Inc., Waterford, N.Y., USA) with Dimethyl methyl phosphonate or Xylene (Sigma Aldrich, St. Louis, Mo., USA) in "max 100" and "max 200" containers (FlakTek Ink, Landrum, S.C., USA). The nano clay platelets (Nanocar 1.34 TN, Southern Clay Products, Inc., Gonzales, Tex., USA), untreated fumed silica (CAB-O-SIL® TS-530 Treated Fumed Silica, Cabot Corporation, Alpharetta, Ga., USA), or core-shell particles (GENIOPERL® P52, Wacker Chemie AG, Munich, Germany) are added stepwise, followed by mixing in vacuum (20 Torr) in a DAC 600 VAC speed mixer after each step (1:30 min at 800 rpm, 1:30 min at 1600 rpm, and 2:00 min at 2000 rpm, FlakTek). After allowing the inks to cool down to room temperature, the Basionics VS03 (BASF, Ludwigshafen, Germany) or Epikure 3230 curing agents (Momentive Performance Materials Inc.) are added and mixed with a shorter cycle (0:30 min at 800 rpm, 0:30 min at 1600 rpm, and 1:00 min at 2000 rpm). For the interfacial layer material, SE1700 (Dow Corning, Midland, Mich., USA) is mixed with the catalyst for 2 min at 2000 rpm. The amounts of individual constituents are given in Table 1.

TABLE 1

Composition of Exemplary Ink Formulations for Core, Shell and Barrier Layer

|  | Core | Shell | Barrier layer |
| --- | --- | --- | --- |
| Epon 826 | — | 100 | — |
| Epon 872 | 100 | — | — |
| Nanoclay | — | 45 | — |
| Untreated fumed silica | 18 | — | — |
| Core-shell particles | 4 | — | — |
| Dimethyl methylphosphonate | — | 5 | — |
| Xylene | 33 | — | — |
| VS 03 | — | 5 | — |
| Epikure 3230 | 12 | — | — |
| SE 1700 | — | — | 100 |
| SE 1700 Catalyst | — | — | 10 |

Ink Rheology:

The rheological properties of the inks are characterized using a Discovery HR3 rheometer (TA Instruments, New Castle, Del., USA) with a 40 mm flat parallel plate and a gap distance of 500 µm. For the Epon 872 resin, a gap distance of 1000 µm is used. The base resins exhibit viscosity and storage and loss moduli that are independent of shear rate and shear stress, but the final ink formulations exhibit viscoelastic properties, as shown in FIGS. 3A and 3B.

Printhead Fabrication:

The printheads are fabricated on an Aureus Plus 3D printer using HTM140 material (EnvisionTEC, Dearborn, Mich., USA).

3D Printing:

The inks are loaded into Luer lock syringe barrels of 10 ml or 30 ml (Nordson EFD, East Providence, R.I., USA) and centrifuged for 8 min at 2200 rpm to remove the bubbles from the ink. The printhead is mounted on an Aerotech 3-axis stage (Aerotech, Inc., Pittsburgh, Pa., USA), and connected to the loaded syringes through the Luer locks. The material extrusion is controlled with an Ultimus V pressure pump (core, Nordson EFD), a PHD Ultra syringe pump (interfacial layer, Harvard Apparatus, Cambridge, Mass., USA), and an Ultra™ 2800 positive displacement dispenser (shell, Nordson EFD). All printed and tested structures are cured sequentially for one hour at 80° C., 15 hours at 100° C., and one hour at 220° C.

Characterization:

The dimensions of the printed structures are measured with a VHX-2000 optical microscope and a VH-Z20R 20×-200× optical zoom lens (Keyence, Osaka, Japan), which is calibrated before each session. The mechanical properties are measured on an Instron 5566 Universal Testing Machine with a constant speed of 10 mms$^{-1}$ (Instron, High Wycombe, United Kingdom). For the struts, a 10 N static load cell is used, and for the lattice structures a 1000 N static load cell. The displacement is measured with an Advanced Video Extensometer (Instron). The reported properties represent a mean of at least three samples.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A 3D printed core-shell filament comprising:
   an elongated core radially surrounded by an outer shell with a barrier layer in between,
   wherein the elongated core comprises a ductile polymer and the outer shell comprises a stiff polymer having a Young's modulus higher than that of the ductile polymer,
   wherein the elongated core has a width or diameter d and the outer shell has a width or diameter D, and wherein a ratio d/D is in a range from about 0.8 to about 0.9.

2. The 3D printed core-shell filament of claim 1, wherein the barrier layer has a thickness at least about 10 times smaller than a width or diameter D of the outer shell.

3. The 3D printed core-shell filament of claim 1, wherein the stiff polymer comprises a Young's modulus of at least about 4 GPa.

4. The 3D printed core-shell filament of claim 1, wherein the ductile polymer comprises a Young's modulus of about 2 GPa or less.

5. The 3D printed core-shell filament of claim 1, wherein the stiff polymer is selected from the group consisting of: an epoxy, vinylester, polyester and polymethyl methacrylate.

6. The 3D printed core-shell filament of claim 1, wherein the ductile polymer is selected from the group consisting of: an epoxy, polyurethane, thermoplastic polyurethane and polycarbonate.

7. The 3D printed core-shell filament of claim 1, wherein one or both of the stiff and ductile polymers comprise an epoxy.

8. The 3D printed core-shell filament of claim 1, wherein one or both of the stiff and ductile polymers include reinforcement particles dispersed therein.

9. The 3D printed core-shell filament of claim 1, wherein the barrier layer comprises a barrier polymer having a coefficient of friction of at least about 1 with respect to each of the ductile and stiff polymers.

10. The 3D printed core-shell filament of claim 1, wherein the barrier layer comprises a barrier polymer selected from the group consisting of: silicone and polytetrafluoroethylene.

11. The 3D printed core-shell filament of claim 1, wherein the elongated core is hollow.

12. The 3D printed core-shell filament of claim 1, further comprising a soft external layer on the outer shell, the soft external layer comprising a soft polymer having a lower Young's modulus than the stiff polymer.

* * * * *